Nov. 26, 1940.   H. PUPPE   2,222,720
ELECTRIC VALVE CIRCUITS
Filed March 17, 1939   2 Sheets-Sheet 2
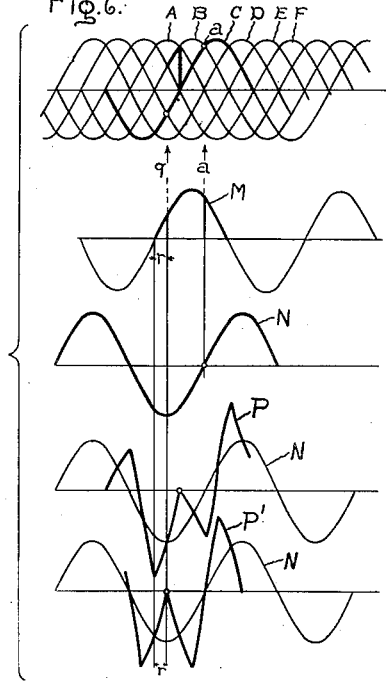
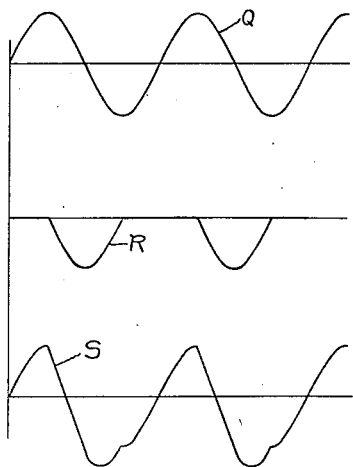
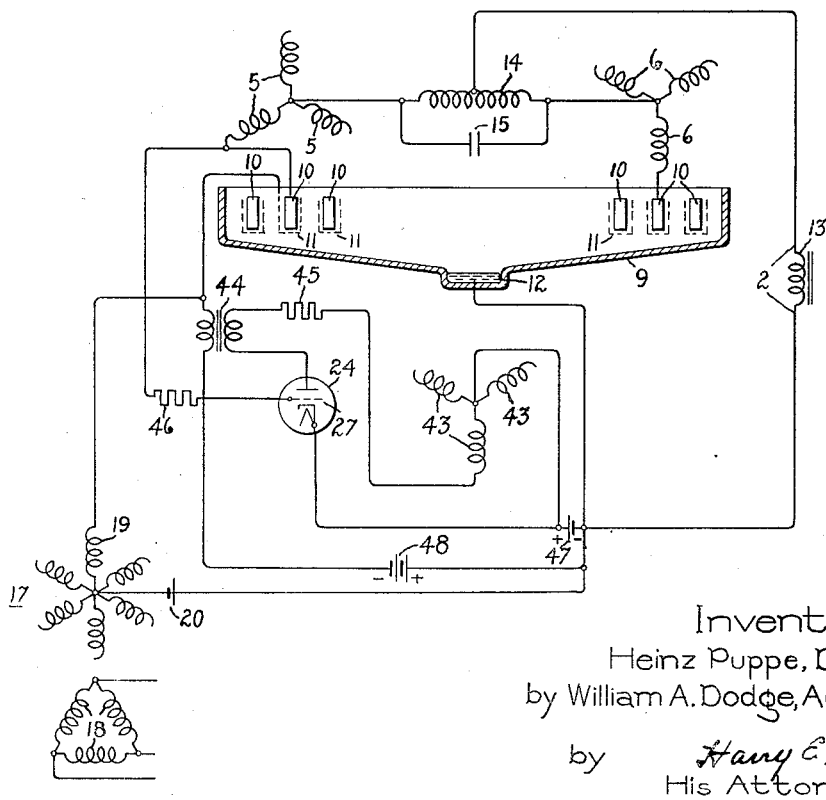
Inventor:
Heinz Puppe, Deceased,
by William A. Dodge, Administrator,
by Harry E. Dunham
His Attorney Patented Nov. 26, 1940

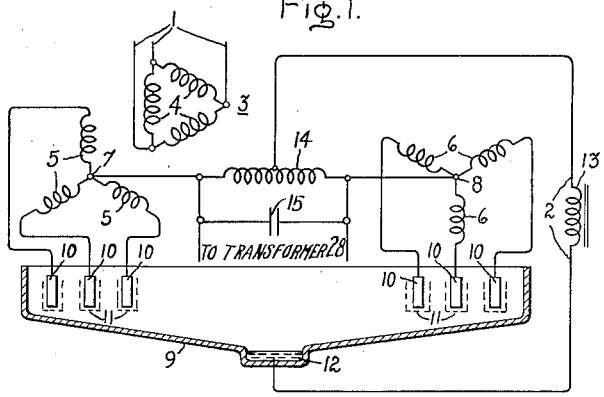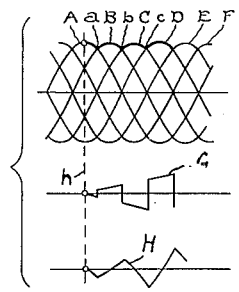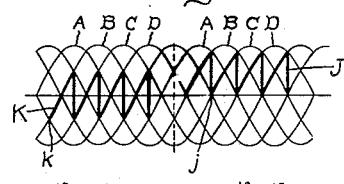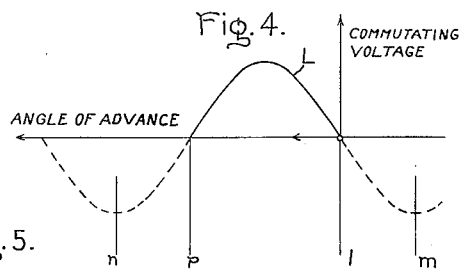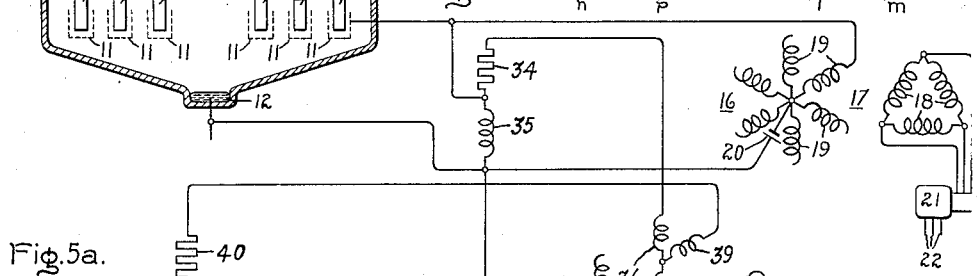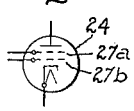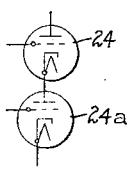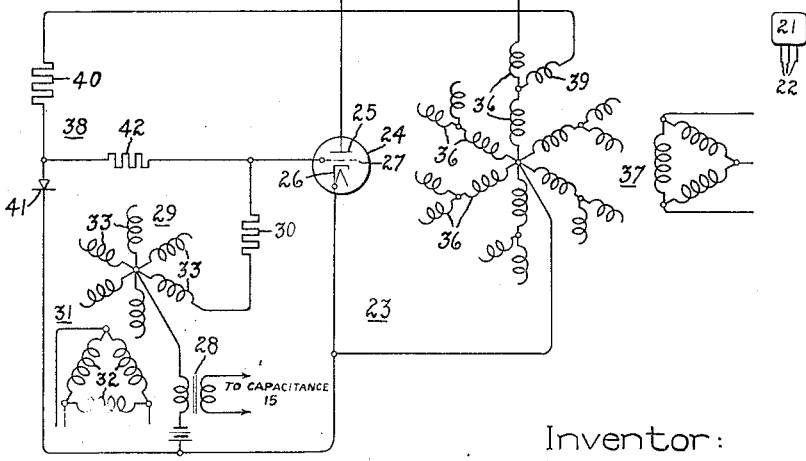

2,222,720

UNITED STATES PATENT OFFICE 2,222,720

ELECTRIC VALVE CIRCUITS

Heinz Puppe, deceased, late of Berlin-Reinickendorf, Germany, by William A. Dodge, administrator, Schenectady, N. Y., assignor to General Electric Company, a corporation of New York Application March 17, 1939, Serial No. 262,543
In Germany April 6, 1938

15 Claims. (Cl. 175—363)

The invention relates to electric valve circuits and more particularly to commutating arrangements for electric valve translating apparatus for transmitting power between direct current circuits and alternating current circuits or between different alternating current circuits.

As is well understood by those skilled in the art, in arrangements for transmitting power by means of electronic discharge devices of the controlled type, there are distinct regions of operation within which electronic discharge devices may be controlled without the use of auxiliary commutating means. For example, there are regions established by load conditions and by the phase relationship of the applied anode-cathode voltages and the control member or grid voltages within which rectification and inversion may be accomplished without the use of what has been termed "forced commutation." However, when it is desired to control the electric translating apparatus within other regions, it is necessary to resort to arrangements which provide commutating voltages to effect commutation of current between the various electric valve means in the system at the desired instants. In accordance with the teachings of the invention described hereinafter, there is provided new and improved electric valve circuits whereby greater flexibility in operation of electric valve rectifiers, inverters and frequency changers is obtained.

It is an object of the invention to provide new and improved electric valve translating circuits.

It is another object of the invention to provide new and improved control circuits for electric valve means.

It is a further object of the invention to provide new and improved commutating means for electric valve rectifiers and inverters.

It is a still further object of the invention to provide new and improved commutating circuits for electric valve converters for the transfer of power between alternating and direct current circuits, or between alternating current circuits.

It is a still further object of the invention to provide a new method of operating electric valve converters employing commutating means.

In accordance with the illustrated embodiments of the invention, there is provided improved electric valve translating systems for transmitting power between alternating and direct current circuits and which comprise an inductive network and a plurality of electric discharge paths which conduct current in a predetermined order or sequence. A commutating means, such as a capacitance, is connected in the inductive network to provide a commutating voltage. In order to permit initiation of operation of the translating system when the commutating means is not in condition to perform its intended function, there is provided a control system and method of operation which initiates operation of the electric valve apparatus within a region of the anode-cathode voltage which does not require forced commutation and which subsequently controls the electric valve apparatus to cause it to operate within a region which requires forced commutation when the commutating means is in a condition to perform its intended function. More specifically, there is impressed on the control members of the various discharge paths of the electric valve means periodic voltages of predetermined phase displacement with respect to the voltage of the associated alternating current circuit and shift the phase of the resultant voltages impressed on the control members by means of a control circuit which is responsive to the voltage produced by the capacitance. The control circuit comprises an electronic discharge device of the controlled type having a grid which is rendered conductive in accordance with the voltage of the capacitance. Upon initiation of operation, the electric valve means, which may operate either as an inverter or as a rectifier, is rendered conductive in those regions in which forced commutation is not necessary, and the control circuit shifts the phase of the control voltage when the commutating voltage of the capacitance attains a predetermined value. Additional means is also provided in one embodiment to prevent undesired operation of the electronic discharge device occasioned by undesirable harmonics or ripples in the capacitor voltage which are due to the initiation of current between the various electronic discharge paths.

For a better understanding of the invention, reference may be had to the following description taken in connection with the accompanying drawings, and its scope will be pointed out in the appended claims. Fig. 1 diagrammatically illustrates an electric valve circuit to which the invention is shown as applied and Figs. 2, 3 and 4 represent certain operating characteristics thereof. Fig. 5 diagrammatically illustrates an embodiment of the invention as applied to the arrangement of Fig. 1, and Figs. 5a and 5b represent certain modifications of the arrangement shown in Fig. 5. Figs. 6 and 7 represent certain operating characteristics of the embodiment of the invention shown in Fig. 5. Fig. 8 diagrammatically illustrates a further embodiment of the invention.

Referring now to Fig. 1, there is diagrammatically illustrated the invention as applied to an electric valve translating apparatus for transmitting power between an alternating current circuit 1 and a direct current circuit 2 through an inductive network which may comprise a transformer 3 having a plurality of primary windings 4 and two groups of secondary windings 5 and 6, each of which may be arranged in a Y-connection to form a double Y or six-phase arrangement and having neutral connections 7 and 8, respectively. The translating apparatus also includes a plurality of electric discharge paths and may be provided by a plurality of individual electronic discharge devices or electric valve means or, as shown in the drawings, may comprise a plurality of electric discharge paths placed within a single receptacle 9 and each including an anode 10, a control member 11 and an associated cathode 12 which may be of the self-reconstructing type such as a mercury pool cathode. An inductance 13 may be connected in the direct current circuit, if desired. A suitable interphase transformer 14 may be connected between the neutral connections 7 and 8, and a suitable commutating means, such as a capacitance 15, may be connected across the terminals of the interphase transformer. Of course, it is to be understood that any other well known commutating means may be employed and may be connected at other suitable points in the system.

Referring to Fig. 2, curves A, B, C, D, E and F represent the anode-cathode voltages of the electric valve means and the heavy curve represents the rectified voltage which is impressed on the direct current circuit 2 when the system is operating as a rectifier. Without the use of the control members 11, each of the electric discharge paths will begin to conduct current at the intersection point of its voltage curve and the voltage curve of the anode preceding it in the order of phase rotation. That is, commutation will be effected at times $a$, $b$ and $c$, etc. Curve G represents the manner in which the current transmitted through the capacitance 15 increases when the operation of the circuit is initiated at time $h$, and curve H represents the voltage appearing across the terminals of the capacitance 15 and, of course, also represents the commutating voltage effective in the system. The commutating voltage build-up across the terminals of the capacitance 15 produces a voltage which raises the voltage for the next succeeding anode to conduct above that which would ordinarily be present without the commutating means, and hence affords a flexible arrangement for increasing the effective region of operation of the electric valve means.

An inspection of the operating characteristics of Fig. 2 will reveal that if it is desired to advance the commutating time, for instance beyond the times $a$, $b$, $c$, etc., a commutating voltage must be provided by additional means. The ordinates of the curve J of Fig. 3 represent the voltage necessary to effect commutation at times $j$, that is, at times 60° in advance of that shown by curves A, B and C of Fig. 2. The ordinates of curve K represent the voltage necessary to effect commutation of current at times $k$. It is apparent that, for rectification, the commutating voltage becomes greater as the range of commutation is advanced, and varies as a sinusoidal function of the angle of advance. Curve L of Fig. 4 diagrammatically illustrates the commutating voltage required for various regions of operation of an electric valve converter. The region $l$—$m$ represents the region of grid control within which rectifier operation may be accomplished without the use of forced commutation, and the region $n$—$p$ represents the region of grid operation within which inverter operation may be effected without the use of forced commutation. Within the region $p$—$l$, it is necessary to employ additional or forced commutating means. When transmitting power in either direction through an electric valve converter, stable operation will be effected only when the current is commutated from one anode to the next at an instant in which the anode carrying the decreasing current is at a lower potential relative to that of the anode to which the current is just being transferred. In other words, commutation is only possible at instants in which the relative potential difference between the anodes is in the requisite direction to effect the current transfer. Of course, there is a definite region in rectifying operation in which phase commutation may be employed without the use of auxiliary commutating means as shown by the curves of Figs. 2, 3 and 4, and in inverter operation there is a definite region within which current may be properly commutated, also illustrated by the curves of Figs. 2, 3 and 4.

Fig. 5 diagrammatically illustrates an embodiment of the invention as applied to the arrangement shown in Fig. 1, and corresponding elements have been assigned like reference numerals. In accordance with the invention, there is provided a system and method of operation which initiates operation of the electric valve means within a region which does not require the existence of an additional commutating voltage, and after the commutating voltage increases to a predetermined value, the phase of the voltage impressed on the control members 11 is adjusted or shifted to the desired region of operation which may be within the regions which require additional or commutating voltages, there is provided an excitation circuit 16 which impresses on the control members 11 periodic or alternating voltages of predetermined phase displacement, relative to the voltage of circuit 1, to render the electric discharge paths conductive at a predetermined time during the initiating operation. The excitation circuit 16 may comprise a transformer 17 having a plurality of primary windings 18 and a plurality of secondary windings 19, each of which is associated with a different one of the control members 11. A suitable source of unidirectional biasing potential, such as a battery 20, may be employed. The excitation circuit 16 may be energized from circuit 1, if desired, or may be energized through a suitable phase shifting device 21 from any suitable source of alternating current 22 correlated in frequency with respect to the voltage of circuit 1.

In order to shift the phase of the resultant voltage impressed on the control members 11 after the initiation of the operation of the translating system and after the voltage of the commutating means attains a predetermined value, there is provided a plurality of control circuits, such as control circuit 23, each of which is associated with a different one of the control members 11. For the purpose of simplification, only one control circuit is shown. The control circuit 23 may be responsive to a predetermined electrical condition, such as the voltage of the commutating capacitance 15, and may include a control electric valve or an electronic discharge device 24 which is preferably of the type employing an ionizable medium such as a gas or a vapor, and which includes an anode 25, a cathode 26 and a control member or grid 27. As a means for controlling the conductivity of the electronic discharge device 24 in accordance with the commutating voltage, there is employed a suitable means responsive to the voltage of the commutating capacitance 15, such as a transformer 28 which impresses a control voltage on the grid 27 through an inductive network 29 and a suitable current limiting resistance 30. The inductive network 29 produces a voltage which preferably lags the anode-cathode voltage of the electronic discharge device 24, and the network may be supplied by a transformer 31 comprising a plurality of primary windings 32 and a plurality of secondary windings 33.

The control voltage provided by control circuit 23 is impressed on the associated control member 11 by means of a circuit which may include a resistance 34 and a serially connected inductance 35 which are energized by the current transmitted by electronic discharge device 24. The anode-cathode circuit of electronic discharge device 24 is energized by one winding of a plurality of windings 36 which may be the secondary windings of a transformer 37.

As a means for rendering the electronic discharge device 24 unresponsive to the undesirable ripples in the commutating voltage of capacitance 15, there is provided a compensating circuit 38 associated with electronic discharge device 24 and which impresses on the grid 27 a negative or biasing hold-off voltage to prevent initiation of the associated principal discharge path at undesired instants. More particularly, there is provided a circuit including a source of voltage which lags the anode-cathode voltage of the electronic discharge device 24 and which is controlled to impress only the negative half cycle of voltage on the grid 27. The source of voltage may comprise a winding 39 of transformer 37 and include a serially connected resistance 40 and a suitable rectifying or unidirectional conducting device 41. A suitable impedance, such as a resistance 42, is connected between the common junction of the resistance 40 and the unidirectional conducting device 41 and the grid 27.

The operation of the embodiment of the invention diagrammatically illustrated in Fig. 5 will be explained by considering the system when it is operating as a rectifier and when it is desired to advance the time of initiation of the discharges within the various electric discharge paths into those regions in which forced commutation is necessary. According to the new method which there is provided, the electric discharge paths are initiated in operation within a region in which forced commutation is not necessary as, for example, the various electric discharge paths are rendered conductive initially at times $a$ of Fig. 6. As is well understood by those skilled in the art, commutation takes effect at times $a$ by virtue of the phase commutation. However, if it is desired to effect commutation at times $q$, it is necessary to employ forced commutation. Upon initiation of the operation of the system no commutating voltage is present across the capacitance 15 and it is, therefore, necessary to wait a predetermined interval of time until the voltage attains a satisfactory operating value. After the voltage of the capacitance 15 builds up, the electronic discharge device 24 is rendered conductive in each of the control circuits 23 to transmit current through its associated anode-cathode circuit and to advance the phase of the resultant voltage impressed on the associated control member 11, thereby operating the electric valve means within the region at which forced commutation is necessary or required. It is to be understood that such advance is not initiated until there is sufficient commutating voltage available. The voltage impressed on the primary winding of the transformer 28 renders the electronic discharge device conductive at the desired time, so that the associated principal electric discharge path is rendered conductive precisely at the desired instant. Likewise, the other control circuits 23 (not shown) render the other discharge paths conductive in the proper order and at the desired instants.

Curve M of Fig. 6 diagrammatically illustrates the anode-cathode voltage of the electronic discharge device 24. Curve N represents the voltage impressed on grid 27 of discharge device 24 by winding 33. Curve P represents the sum of the alternating component of voltage furnished by the associated winding 33 and the periodic voltage obtained from the commutating capacitance 15. The alternating voltage furnished by winding 33 and represented by curve N would render the electronic discharge device 24 conductive at time $a$, but the combined or resultant voltage as represented by curve P effects an advance in phase of the control voltage to time $q$. It will be apparent that there is a critical region $r$ to which or beyond which it is undesirable to advance the phase of the voltage by virtue of the fact that the anode voltage is not sufficient to initiate an arc. Due to the fact that the commutating capacitance 15 is also providing a commutating voltage for the other discharge paths of the principal or main electric valve means, its voltage varies at a periodicity which is directly proportional to the number of discharge paths in the system. The commutating voltage is irregular and contains a number of harmonics and were it not for additional control or compensating apparatus 38, the control voltage would have the form represented by the curve P' of Fig. 6. It will be apparent that the resultant control voltage P' approaches zero value at a time in the critical region, thereby making it important to employ additional compensating means so that the phase of the resultant control voltage is not advanced into or beyond this critical region. Compensating circuit 38 controls the conductivity of the electronic discharge device 24 in a manner to render it unresponsive to the undesirable harmonics in the voltage derived from the commutating capacitance 15. The operation of the compensating circuit 38 may be more fully understood by referring to the operating characteristics shown in Fig. 7. Curve Q represents the alternating voltage provided by winding 33 of transformer 31 and curve R represents the rectified or the negative half cycles of alternating voltage derived from winding 39 through resistance 40 and the unidirectional conducting device 41, and which is superimposed on the alternating voltage of winding 33. Curve S represents the resultant voltage which is impressed on the grid 27. It is of advantage to have the voltage produced by winding 39 lead the voltage produced by winding 33 by a substantial angle as, for example, an angle of 90 electrical degrees. This relationship may be effected by choice of the phase relationship of the windings of transformers 37 and 31.

Instead of using an electronic discharge device having a single grid, such as electronic discharge device 24, and impressing thereon the various control voltages, there may be employed an electronic discharge device shown in Fig. 5a having two control grids 27a and 27b which conjointly control the conductivity of the device. The control grid 27b may be connected to resistance 30 of the arrangement of Fig. 5, and the control grid 27a may be energized from the compensating circuit 38.

A further modification is shown in Fig. 5b in which two serially-connected electronic discharge devices may be employed. The grid of one of the discharge devices, such as discharge device 24, may be energized from the compensating circuit, and the grid of the other discharge device 24a may be energized from that part of the control circuit 23 including transformer 31 and transformer 28.

Fig. 8 of the accompanying drawings diagrammatically illustrates another embodiment of the invention which is similar in many respects to the arrangement shown in Fig. 5 and corresponding elements have been assigned like reference numerals. In the arrangement of Fig. 8, it is to be understood that a plurality of circuits are employed in the complete system and only one of the control circuits is shown to simplify the presentation of the invention. Electronic discharge device 24 advances the phase of the resultant control voltage impressed on control members 11 in accordance with the commutating voltage and is energized from transformer windings 43. The voltage for initiating the transmission of current by the electric valve means is supplied by the secondary winding 19. A transformer 44 is connected in series with the anode-cathode circuit of the electronic discharge device 24. A current limiting resistance 45 may be connected in the control circuit and a further resistance 46 may be connected in series relation with the grid 27. The voltage provided by the associated winding 43 leads the voltage of the associated primary winding 5 by an appreciable angle as, for example, by an angle of 60 electrical degrees. It will be noted that the grid 27 is responsive to the potential of the associated principal anode 10 and that the anode-cathode circuit voltage of the electronic discharge device 24 leads the anode-cathode voltage of the principal discharge path. A suitable source of negative unidirectional biasing potential such as a battery 47, is connected between the cathode 12 and the anode-cathode circuit of the electronic discharge device 24, and another source of biasing potential, such as a battery 48, may be employed to impress a negative unidirectional biasing potential on the control member 11 of the associated principal electric discharge path.

The embodiment of the invention shown in Fig. 8 operates in substantially the same manner as that explained above in connection with the arrangement of Fig. 5. Inasmuch as the electronic discharge device 24 is responsive to the anode voltage of the associated principal electric discharge path, and since the voltage of the anodes is increased as the commutating voltage provided by capacitance 15 increases, the electric valve means will be rendered conductive initially within a region of anode voltage in which forced commutation is not necessary and will be shifted to a region of operation in which forced commutation is necessary. The magnitude of the unidirectional biasing potential 47 determines the potential at which electronic discharge device 24 is rendered conductive, and the magnitude of the voltage of battery 48 determines the point in the cycle of anode voltage at which the principal electric discharge path is rendered conductive. When electronic discharge device 24 is rendered conductive, a voltage impulse is generated in the transformer 44 and is impressed on the associated control member 11.

The embodiments of the invention shown in Figs. 5 and 8 have been explained in connection with rectifier operation, that is, have been explained as applied to arrangements in which the phase of the control voltages is advanced from a region in which forced commutation is not necessary to a region in which forced commutation is necessary. It will be understood by those skilled in the art that the invention is equally applicable to inverters and frequency changers in which the phase of the control voltage is retarded to the regions which require forced commutation.

While there is shown and described the invention as applied to particular systems of connections and as embodying various devices diagrammatically shown, it will be obvious to those skilled in the art that changes and modifications may be made without departing from the invention, and it is, therefore, the aim in the appended claims to cover all such changes and modifications as fall within the true spirit and scope of the invention.

What is claimed as new and desired to be secured by Letters Patent of the United States is:

1. In combination, an alternating current circuit, a direct current circuit, electric translating apparatus connected between said circuits and comprising an inductive network and a plurality of electric valve means each having a control member for controlling the conductivity thereof, means for producing a commutating voltage, means for impressing on said control members periodic voltages of predetermined phase relation with respect to the voltage of said alternating current circuit to initiate operation of said translating apparatus within one region of the cycles of voltage of said alternating current circuit where forced commutation is not necessary, and means responsive to an electrical condition of the commutating means for subsequently energizing said control members to render said electric valve means conductive in a region in which forced commutation is necessary.

2. In combination, an alternating current circuit, a direct current circuit, electric translating apparatus connected between said circuits and comprising an inductive network and electric valve means having a control member for controlling the conductivity thereof, commutation means for producing a commutating voltage, means for impressing on said control member a voltage of predetermined phase relation with respect to the voltage of said alternating current circuit, and means for shifting the phase of said voltage in accordance with an electrical condition of said commutating means to shift the region of conduction of said electric valve means relative to the voltage of said alternating current circuit.

3. In combination, an alternating current circuit, a direct current circuit, electric translating apparatus connected between said circuits and comprising an inductive network and electric valve means of the controlled type having a control member for controlling the conductivity thereof, commutation means for producing a commutating voltage, means for impressing on said control member a periodic voltage to initiate operation of said translating apparatus within a region in which commutating voltage is supplied by said inductive network, and means responsive to a predetermined electrical condition of said commutating means for shifting the phase of said voltage after initiation of the operation of said translating apparatus.

4. In an electric power system for transmitting power between an alternating current circuit and a direct current circuit through electric translating apparatus comprising an inductive network, electric valve means having a control member and means for producing the commutating voltage for said electric valve means, the method of operation which comprises initially rendering said electric valve means conductive within a region of operation in which sufficient commutating voltage is derived from said alternating current circuit and subsequently shifting the phase of the voltage impressed on the control member in response to the voltage developed by said commutating means.

5. In combination, an alternating current circuit, a direct current circuit, electric translating apparatus connected between said circuits and comprising an inductive network, an electric valve means having a control member for controlling the conductivity thereof and commutating means for producing a commutating voltage, means for impressing on said control member a voltage of predetermined phase displacement relative to the voltage of said alternating current circuit, and means responsive to the voltage of said commutating means for shifting the phase of the resultant voltage impressed on said control member.

6. In combination, an alternating current circuit, a direct current circuit, electric translating apparatus connected between said circuits and comprising an inductive network, electric valve means having a control member for controlling the conductivity thereof and commutating means for producing a commutating voltage, means for impressing on said control member a voltage of predetermined phase displacement relative to the voltage of said alternating current circuit to initiate operation of said translating apparatus within a region in which commutation may be effected independently of said commutating means, and means responsive to the voltage of said commutating means for shifting the phase of the voltage impressed on said control member into a region in which forced commutation is necessary.

7. In combination, an alternating current circuit, a direct current circuit, electric translating apparatus connected between said circuits and comprising an inductive network, electric valve means having a control member for controlling the conductivity thereof and commutating means for producing a commutating voltage, means for controlling the phase of the voltage impressed on said control member comprising an electronic discharge device having a control member, and means for impressing on said last mentioned control member a voltage responsive to the voltage of said commutating means for controlling the resultant voltage impressed on said first mentioned control member.

8. In combination, an alternating current circuit, a direct current circuit, electric translating apparatus connected between said circuits and comprising an inductive network, electric valve means having a control member for controlling the conductivity thereof and commutating means for producing a commutating voltage, a control circuit for controlling the phase of the voltage impressed on said control member in accordance with the voltage of said commutating means and comprising an electronic discharge device responsive to the voltage of said commutating means, and means for controlling the conductivity of said electronic discharge device to render it unresponsive to the undesired ripples in the voltage produced by said commutating means occasioned by the commutating action.

9. In combination, an alternating current circuit, a direct current circuit, electric translating apparatus connected between said circuits and comprising an inductive network, electric valve means having a control member for controlling the conductivity thereof and commutating means for producing a commutating voltage, means for impressing on said control member a periodic voltage of predetermined phase displacement relative to the voltage of said alternating current circuit to initiate operation of said translating apparatus within a region which does not require forced commutation, and a control circuit for shifting the phase of the resultant voltage impressed on said control member relative to the voltage of said alternating current circuit and comprising an electronic discharge device having a control grid, means for impressing on said control grid a voltage responsive to the voltage produced by said commutating means, and means for impressing on said control grid a voltage to compensate for harmonic voltages in said commutating voltage.

10. In combination, an alternating current circuit, a direct current circuit, electric translating apparatus connected between said circuits and comprising an inductive network and a plurality of electric discharge paths each comprising an anode and a control member for controlling the conductivity thereof, commutating means for producing commutating voltages, means for impressing on the control members periodic voltages to render said discharge paths conductive in a predetermined order and within a region of the cycles of anode voltage in which forced commutation is not necessary, and means responsive to the voltage of the anodes for shifting the phase of said periodic voltages and to change thereby the region of conduction of said electric valve means relative to the voltage of said alternating current circuit.

11. In combination, an alternating current circuit, a direct current circuit, electric translating apparatus connected between said circuits and comprising an inductive network and a plurality of electric discharge paths each comprising an anode and a control member, commutating means energized by said translating apparatus and being connected to control the voltages of the anodes, means for impressing on the control members periodic voltages to render said discharge paths conductive in a predetermined order, and means responsive to the voltages of said anodes for shifting the phase of said periodic voltages and to change thereby the region of conduction of said electric valve means relative to the voltage of said alternating current circuit.

12. In combination, an alternating current circuit, a direct current circuit, electric translating apparatus connected between said circuits and comprising an inductive network and a plurality of electric discharge paths each comprising an anode and a control member, commutating means energized by said translating apparatus and being connected to control the voltages of the anodes, means comprising an electronic discharge device having a grid for impressing on the control member of the associated electric discharge path a periodic voltage to render said discharge path conductive, and means for energizing said grid in accordance with the voltage of the anode of said associated electric discharge path, and to change thereby the region of conduction of said electric valve means relative to the voltage of said alternating current circuit.

13. In combination, an alternating current circuit, a direct current circuit, electric translating apparatus connected between said circuits and comprising an inductive network and a plurality of electric discharge paths each comprising an anode and a control member, commutating means energized by said translating apparatus and being connected to control the voltages of the anodes, and means for energizing the control member of the associated electric discharge path and comprising an electronic discharge device having a grid, said grid being connected to the anode of said associated discharge path.

14. In combination, an alternating current circuit, a direct current circuit, electric translating apparatus connected between said circuits and comprising an inductive network and a plurality of electric discharge paths each comprising an anode and a control member, commutating means energized by said translating apparatus and being connected to control the voltages of the anodes, and means for energizing the control member of the associated electric discharge path and comprising an electronic discharge device having an anode-cathode circuit for impressing on the control member a periodic voltage and having a grid connected to the anode of said associated discharge path.

15. In combination, an alternating current circuit, a direct current circuit, electric translating apparatus connected between said circuits and comprising an inductive network and a plurality of electric discharge paths each comprising an anode and a control member, commutating means energized by said translating apparatus and being connected to control the voltages of the anodes, and means for initiating operation of said translating apparatus in a region of anode voltage in which forced commutation is not necessary and subsequently operating said apparatus in a region where forced commutation is necessary and comprising an electronic discharge device having an anode-cathode circuit and a control grid, means for impressing a periodic voltage of fixed phase relation in said anode-cathode circuit and means for connecting said grid to the anode of the associated electric discharge path.

WILLIAM A. DODGE.
*Administrator of the Estate of Heinz Puppe, Deceased.*